No. 783,082. PATENTED FEB. 21, 1905.
L. H. SIMMONS.
STATION INDICATOR.
APPLICATION FILED MAY 6, 1904.

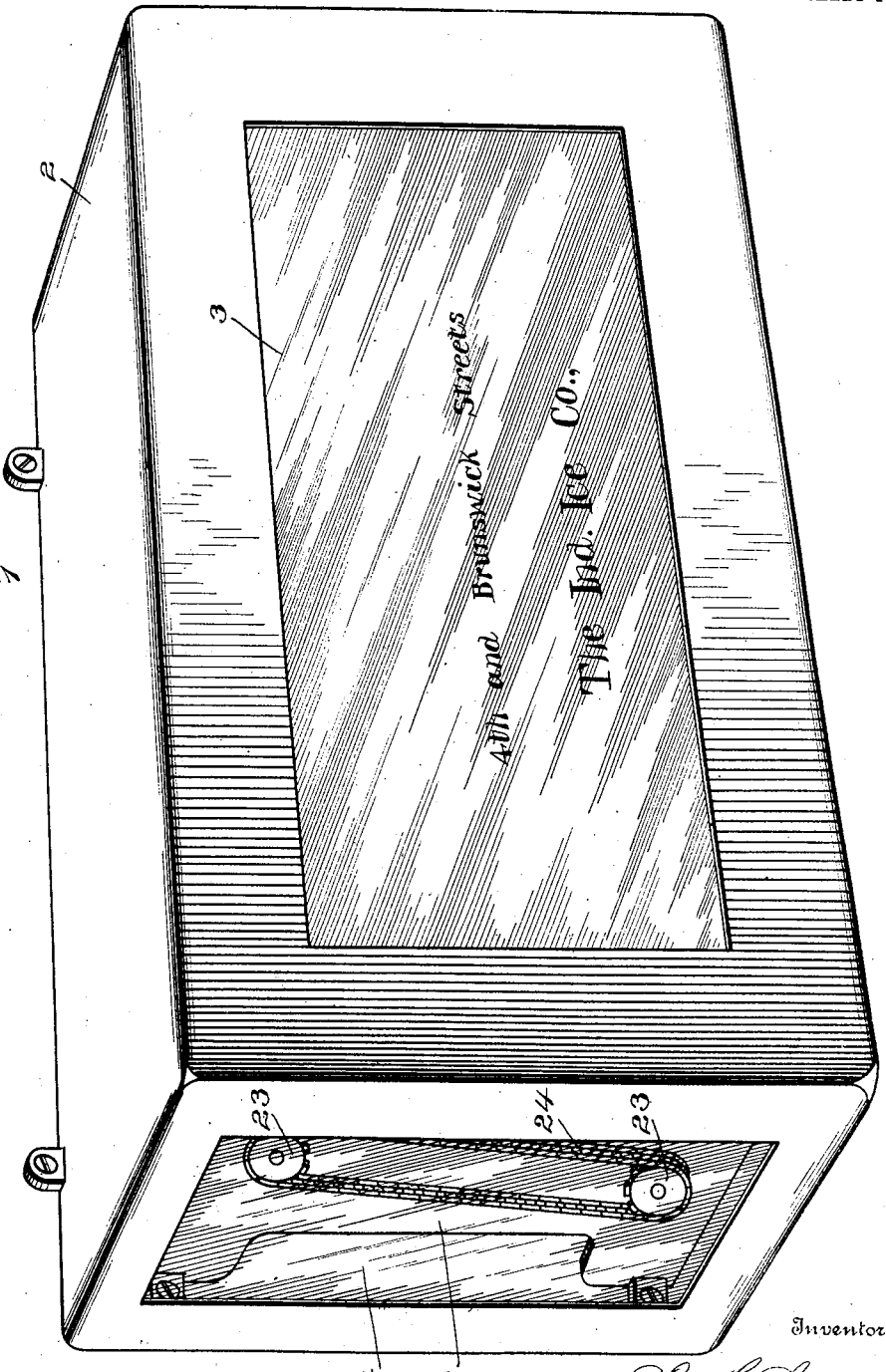

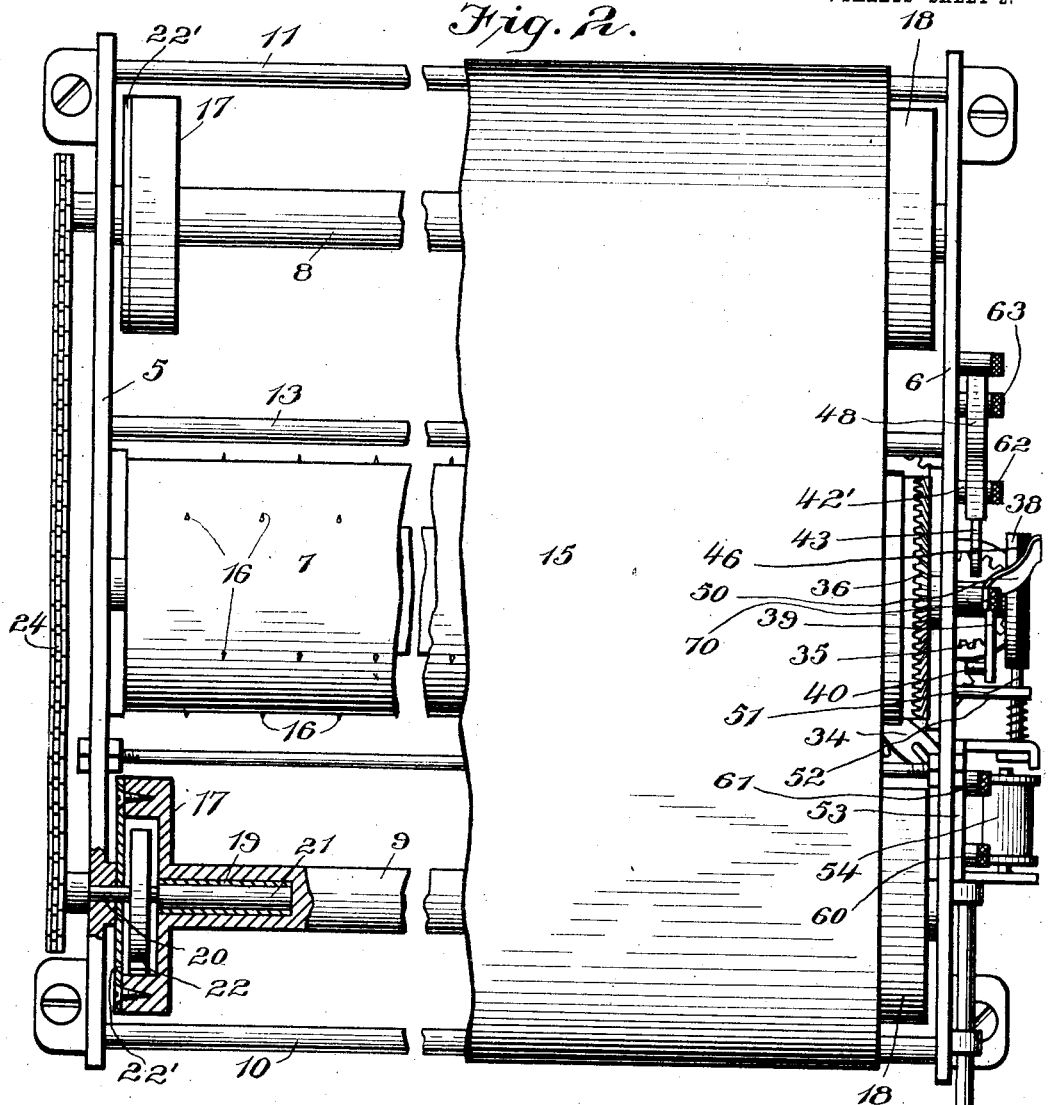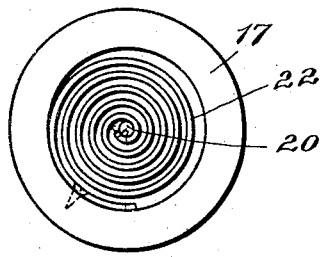

7 SHEETS—SHEET 3.

Witnesses
T. P. Britt
E. C. Duffy

Inventor
Lee H. Simmons
By
O. E. Duffy
Attorneys

No. 783,082. PATENTED FEB. 21, 1905.
L. H. SIMMONS.
STATION INDICATOR.
APPLICATION FILED MAY 6, 1904.

7 SHEETS—SHEET 4.

Witnesses
T. P. Britt
E. C. Duffy

Inventor
Lee H. Simmons,
By
O. E. Duffy & Son
Attorneys

No. 783,082. PATENTED FEB. 21, 1905.
L. H. SIMMONS.
STATION INDICATOR.
APPLICATION FILED MAY 6, 1904.

7 SHEETS—SHEET 5.

Witnesses
T. P. Britt
E. C. Duffy

Inventor
Lee H. Simmons,
By
O. E. Duffy & Son
Attorneys

No. 783,082. PATENTED FEB. 21, 1905.
L. H. SIMMONS.
STATION INDICATOR.
APPLICATION FILED MAY 6, 1904.
7 SHEETS—SHEET 6.
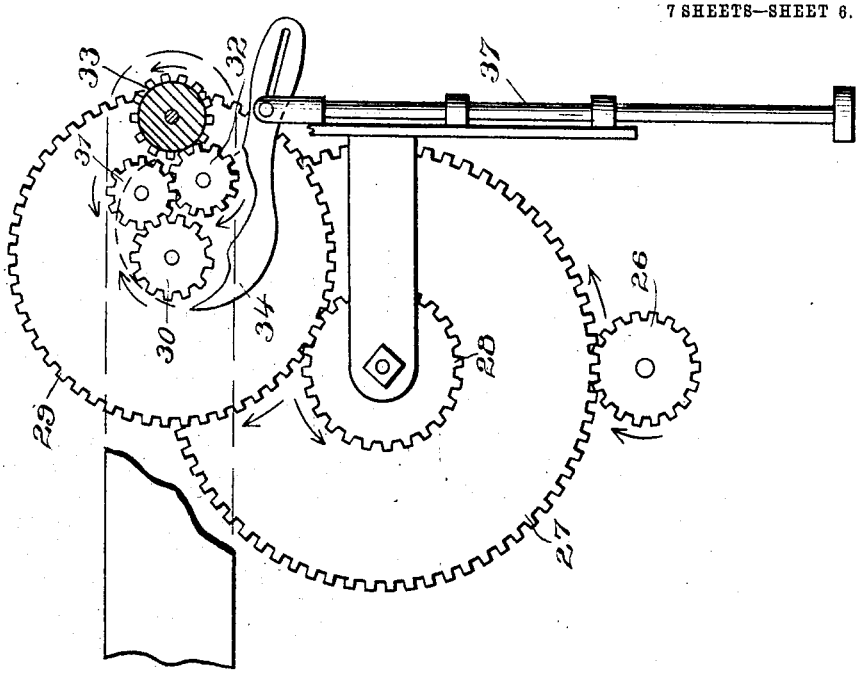
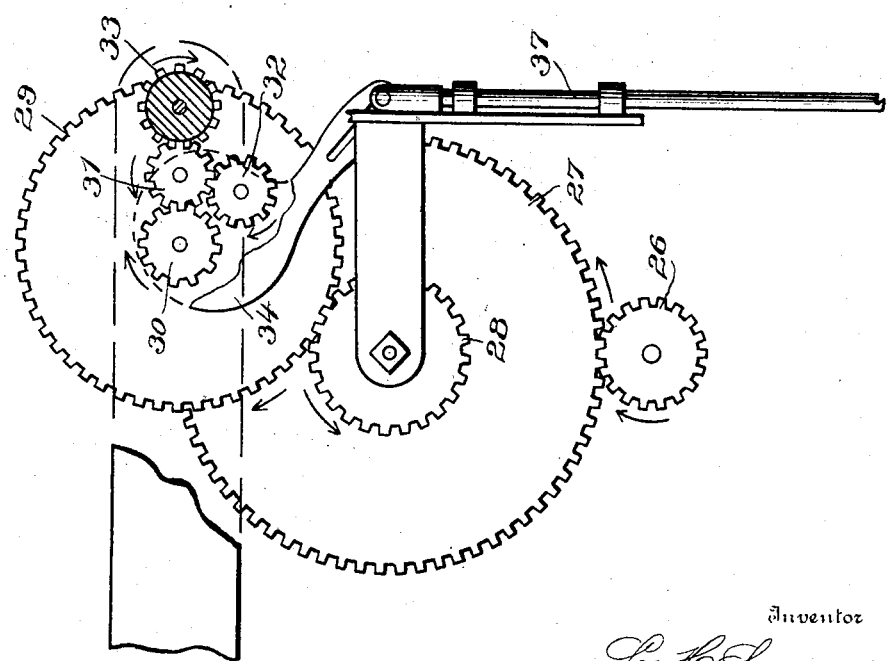
Witnesses
T. P. Britt
E. C. Duffy
Inventor
Lee H. Simmons,
By O. E. Duffy & Son
Attorneys No. 783,082. PATENTED FEB. 21, 1905.
L. H. SIMMONS.
STATION INDICATOR.
APPLICATION FILED MAY 6, 1904.

7 SHEETS—SHEET 7.

Witnesses
T. P. Britt
E. C. Duffy

Inventor
Lee H. Simmons,
By O. E. Duffy & Son
Attorneys

No. 783,082.

Patented February 21, 1905.

UNITED STATES PATENT OFFICE.

LEE HOWARD SIMMONS, OF WILMINGTON, NORTH CAROLINA.

STATION-INDICATOR.

SPECIFICATION forming part of Letters Patent No. 783,082, dated February 21, 1905.

Application filed May 6, 1904. Serial No. 206,639.

*To all whom it may concern:*

Be it known that I, LEE HOWARD SIMMONS, a citizen of the United States, residing at Wilmington, in the county of New Hanover and State of North Carolina, have invented certain new and useful Improvements in Station-Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to station-indicators, but more particularly to electrically-operated station-indicators, and has for its object to provide a device of this class which is operated and controlled by an electric current.

A further object of my invention is to provide a device of this class which is particularly simple in its construction, cheap and easy to manufacture, and composed of a minimum number of parts.

With these objects in view my invention consists in the novel construction of my station-indicator, and my invention further consists in the novel means of actuating and controlling the name-sheet electrically.

My invention also consists in certain other novel features of construction and combinations of parts, which will first be fully described, and afterward specifically pointed out in the appended claims.

I do not claim herein the construction of the rollers allowing for a uniform movement of the name-sheet, as the same is set forth and claimed in my contemporaneous application, Serial No. 206,640.

Figure 3:
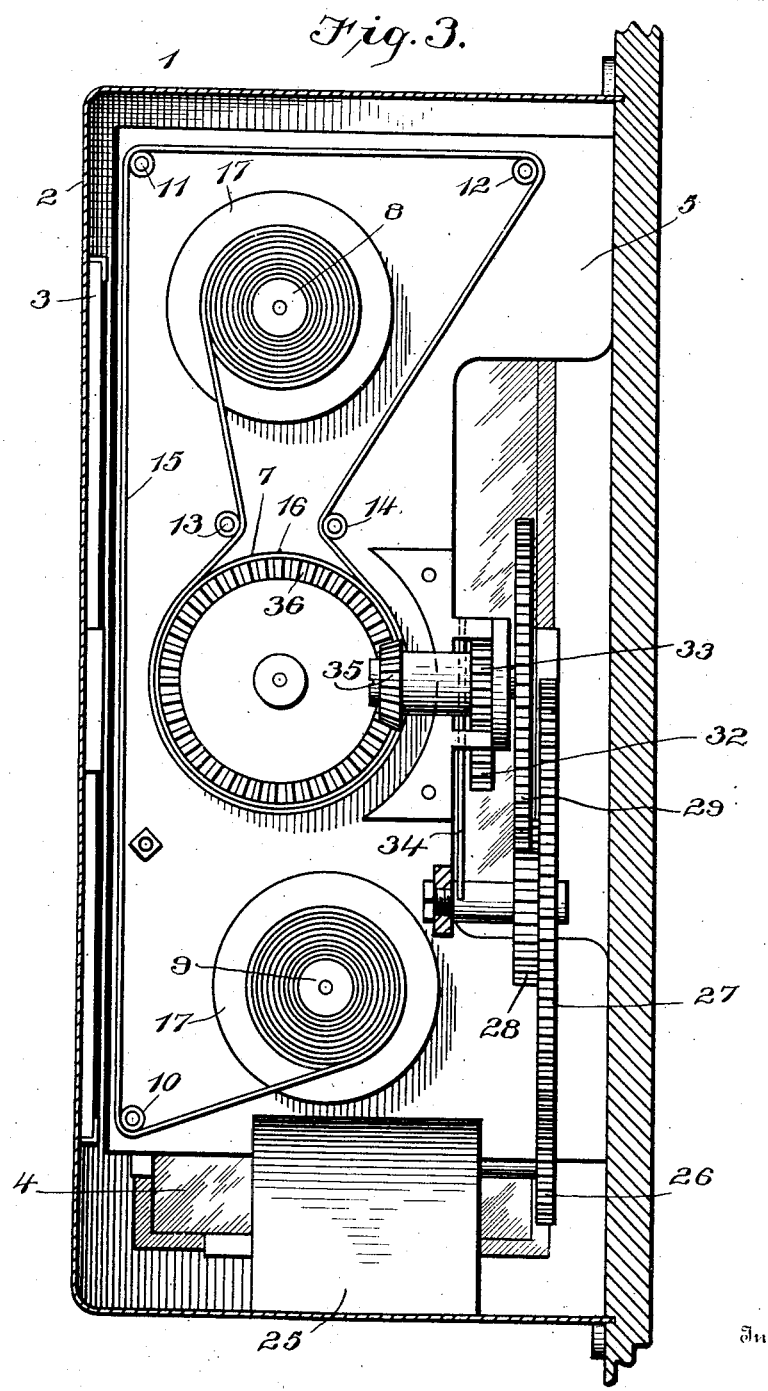
Figure 4:
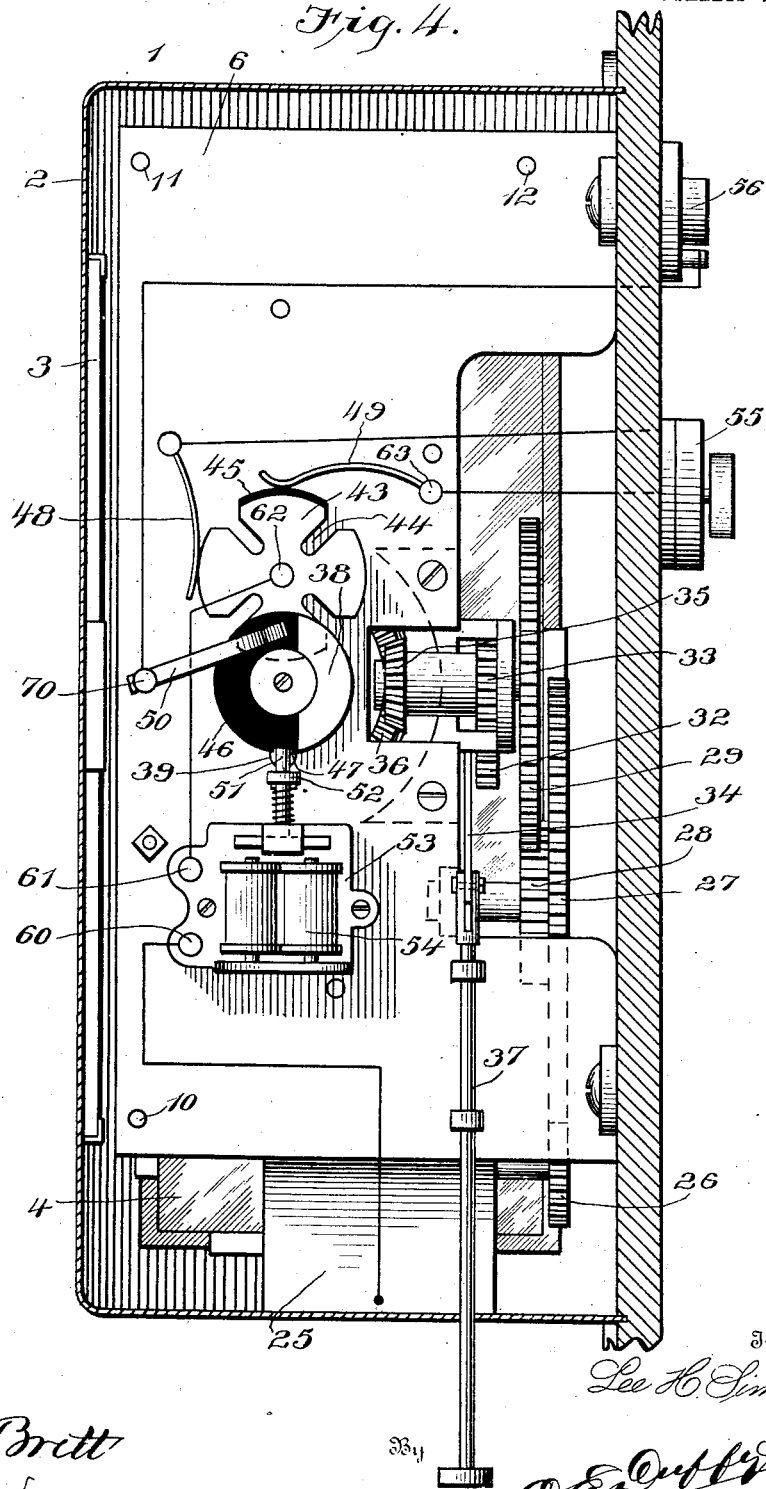
Figure 5:
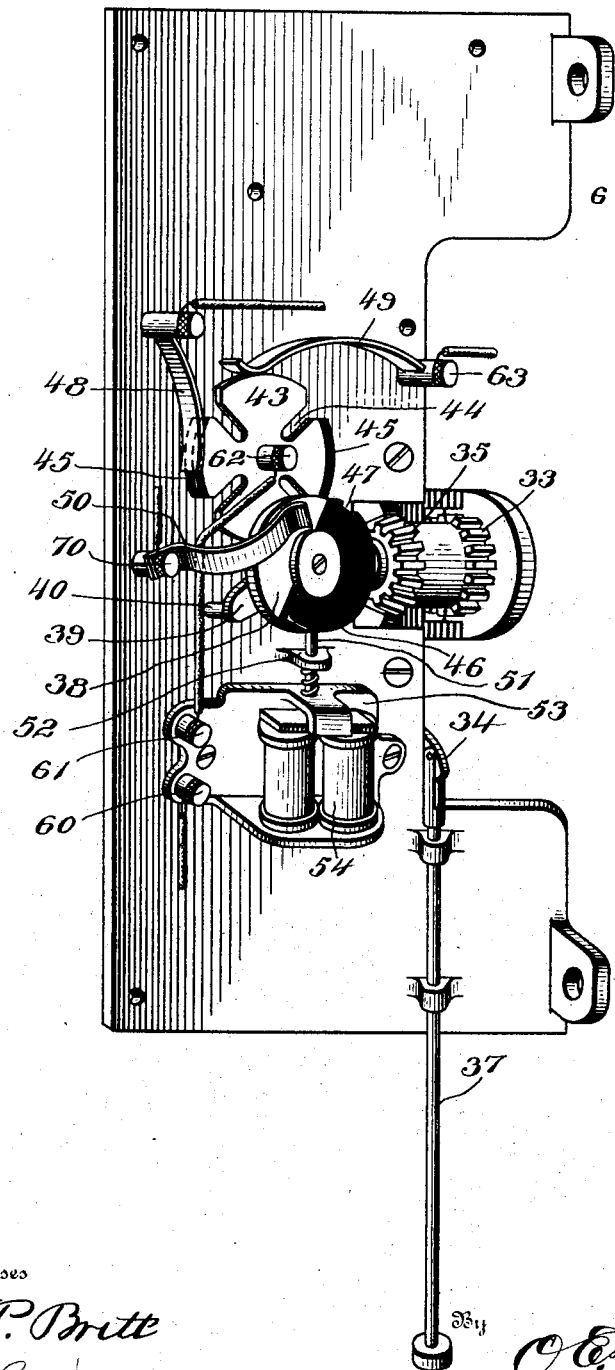
Figure 10:
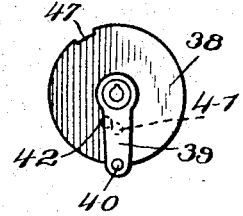
Figure 11:
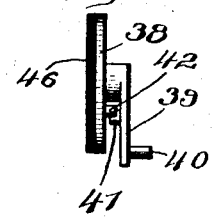
Figure 8:
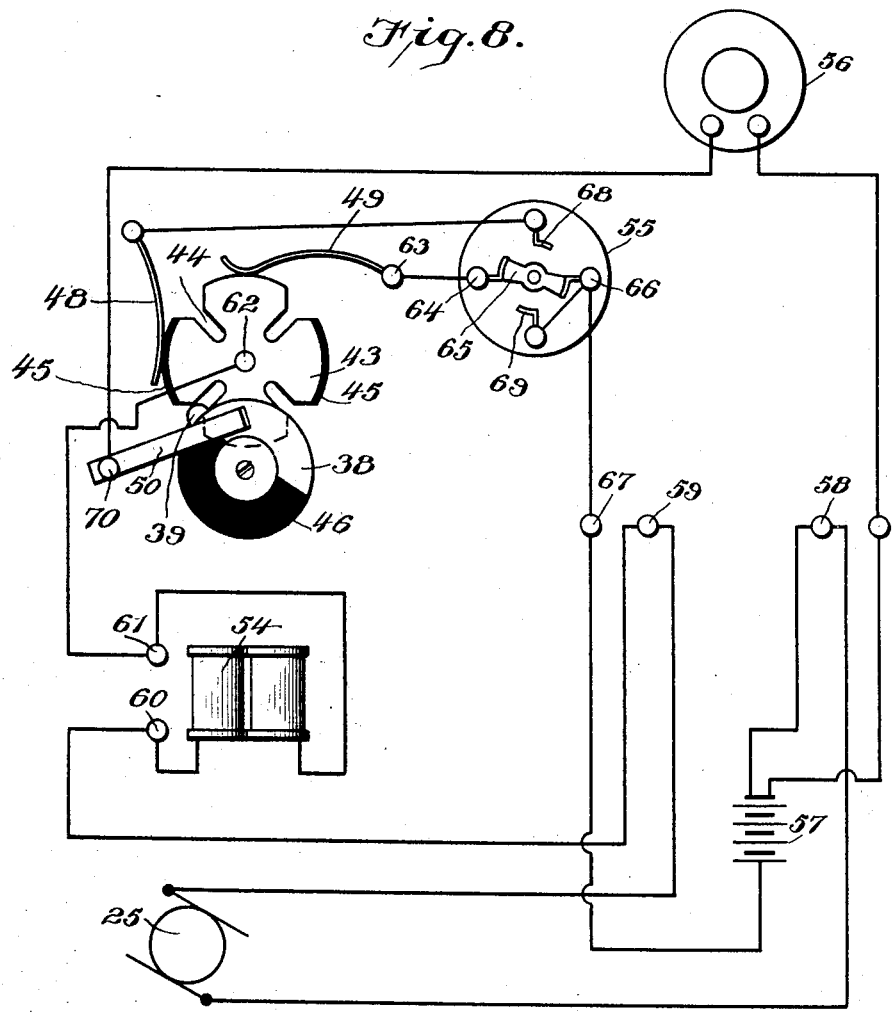

Referring to the accompanying drawings, Figure 1 is a perspective view of my station-indicator. Fig. 2 is a front elevation showing the name-sheet partially removed and the central portions of the rollers broken away in order to enlarge the view. Fig. 3 is a side elevation showing the gearing, rollers, and name-sheet, the casing being removed. Fig. 4 is a side elevation of the indicator, showing the operating mechanism. Fig. 5 is a perspective view of the side of the casing, showing the operating mechanism carried thereon. Fig. 6 is an elevation of the system of gearing I employ. Fig. 7 is a like view showing the gear reversed. Fig. 8 is a diagrammatic view showing the electrical wiring. Fig. 9 is an end elevation of one of the rollers 8 and 9, showing the flange thereon and coil-spring therein. Fig. 10 is a rear elevation of the locking-disk, and Fig. 11 is a side elevation of the same.

Like numerals of reference indicate the same parts throughout the several figures, in which—

1 indicates the indicator, which comprises an outer case or cover 2, having a glass front 3 and glass sides 4. The indicator contained within the outer case or covering is composed of the two preferably metallic sides 5 and 6, and a driving-roller 7 is journaled in said sides at about the centers thereof. Above said driving-roller 7 is the upper winding-roller 8, and a similar winding-roller 9 is located under said driving-roller, as shown in Figs. 2 and 3. Suitable rollers 10, 11, and 12 are located as shown in Fig. 3, over which the name-sheet passes, and idler-rollers 13 and 14 are located just above the driving-roller 7 for the purpose of giving the name-sheet a greater purchase on the driving-roller 7.

15 indicates the name-sheet, which is made of any suitable flexible fabric or material having its free ends attached to the winding-rollers 8 and 9. Referring particularly to Fig. 3, it will be seen that the name-sheet passes from the winding-roller 9 over the small roller 10, whence the sheet passes up and over the small rollers 11 and 12, then to the idler-roller 14, and over the driving-roller 7, whence the sheet passes up and over the idler-roller 13 to the winding-roller 8.

Going into further details concerning the construction of the several rollers, it will be seen that the driving-roller 7 is provided on its surface with a series of rows of small points or projections 16, which are of a sufficient height to engage the name-sheet in order to effectually grip said sheet and prevent the same from slipping on said roller. It will be seen that the winding-rollers 8 and 9 are provided at their ends with annular flanges 17 and 18 and that the flanges 17 are hollow. The rollers proper are provided with a small bore extending a small distance into the roller from the end thereof, and within said bore is located a metallic tube 19.

20 indicates a small shaft having an enlarged inner end 21, which extends within the roller and to which one end of the coil-spring 22 is secured. The outer end of said coil-spring is secured to the flange 17, as shown in Fig. 9, and a covering-plate 22' is secured over the face of said flange 17, as shown in Fig. 2. Secured to the end of said shaft 20 is a small sprocket-wheel 23, as shown in Fig. 1, the construction of the roller 8 being identical with the construction of the roller 9, just described. A suitable sprocket-chain 24 passes over the sprockets 23, as shown in Figs. 1 and 2.

To pass now to the operating mechanism of the indicator, it will be seen in Figs. 3 and 4 that a small electrical motor 25 is employed and located at the bottom of the indicator. 26 indicates a small spur-wheel on said motor, which meshes with a much larger wheel 27, as shown in elevation in Figs. 6 and 7. A pinion-wheel 28 is carried on the same shaft with wheel 27, and said wheel 28 meshes with a larger wheel 29. A small pinion-wheel 30 is carried on the same shaft with wheel 29 and meshes as follows: According as it is desired to reverse the indicator in order to cause the name-sheet to reverse it will be seen by referring to Fig. 6 that the pinion-wheel 30 meshes with a smaller pinion 31, said pinion 31 meshing with a similar pinion 32 and with a larger pinion 33. In this instance, however, the pinion 32 is merely an idler, and it will be seen by following this gearing that the pinion 33 turns in the direction of the arrow, which is the same direction as that of pinion 30, the said pinion 31 and 32 being carried eccentrically on a lever 34, said lever being shown broken away, but the portion broken away being shown in dotted lines. In Fig. 6 said lever is shown in its lowest position, which throws the pinion 31 into mesh with the pinions 30 and 33, as just described.

Referring now to Fig. 7, it will be seen that the lever 34 is in a raised position and that the pinions 31 and 32 are so moved that the pinion 31 is thrown out of mesh with the pinion 33 and the pinion 32 is thrown in mesh with said pinion 33. Following this chain of gearing, it will be seen that while the pinion 30 revolves in the direction of the arrow which is the same direction as it revolves in Fig. 6 the pinion 31 revolves in the direction of the arrow which is in the contrary direction to that of pinion 30. Thus it will be seen that by the movement of the lever 34 the pinion 33 can be caused to be revolved either in the direction as indicated in Fig. 6 or in the direction as indicated in Fig. 7. By this construction the indicator can be reversed, or rather the name-sheet can be run first in one direction and then another, as is of course necessary in order to make the station-indicator applicable for use on street-railways as well as on steam-railways.

Following the chains of gear just described and as shown in Figs. 6 and 7 and referring to Fig. 3, it will be seen that the pinion 33 has connected thereto a beveled pinion 35, which meshes with a bevel-wheel 36, said bevel-wheel being keyed to the shaft of the driving-roller 7. Thus it will be seen that said driving-roller can be revolved in either direction according as the lever 34 is raised or lowered.

Referring again to Figs. 6 and 7, and in this connection also to Figs. 4 and 5, it will be seen that I show a rod 37 for operating the lever 34, although of course it is obvious that any suitable operating means can be employed in this connection. This construction shown provides for the manual operation of the rod 37 in order to change the direction of the movement of the name-sheet.

To pass now to the electrical operating mechanism, it will be seen from Figs. 2, 4, and 5 that the locking-disk 38 is carried on the end of the shaft of the driving-roller 7 and the said disk is, as shown in Figs. 10 and 11, provided on its inner side with a loosely-journaled lever-arm 39, said arm 39 having an inwardly-extending pin 40, as shown clearly in Fig. 11, and also an outwardly-extending pin 41. On the inner face of said disk is a small pin 42, which is adapted to be engaged by the pin 41, as shown in Figs 10 and 11.

Journaled on a small shaft 42' on the casing of the indicator is a revoluble member 43, somewhat similar in contour to a cross. It will be seen that while this member is in the nature of a disk it is provided with four radial slots or notches 44, which extend from the periphery of the member almost to the center thereof, and it will be seen that the two opposite wings of said member are provided with an insulation 45.

Referring again to the locking-disk 38, it will be seen that something more than one-half of the face of said disk is covered with an insulation 46, and it will also be seen from Fig. 4 that the periphery of the wings of the member 43 extends almost to the center of the disk 38, but between said disk and the side of the indicator. The disk 38 is provided, as shown, with a notch 47 in the periphery thereof for purposes which will be hereinafter fully described.

It will be seen from Figs. 4 and 5 that two metal spring-contacts 48 and 49 are arranged at substantially right angles to each other and normally in contact with the periphery of the wings of the member 43. It will also be seen that a similar metal spring-contact 50 is arranged so as to be normally in contact with the face of the locking-disk 38.

51 indicates a bolt or pin which passes through and is guided by a bracket 52, formed on the side of the casing under the locking-disk 38 and is normally held in a raised position by means of a suitable spring, as shown, and 53 indicates a plate secured to said side and carrying an electromagnet 54.

To return to the locking-disk 38, it will be seen from Figs. 10 and 11 that the lever 39 is loosely mounted on shaft of said disk 38, which shaft, it will be remembered, is the shaft of the driving-roller 7, and the pin 40, carried on said lever-arm, engages the winged member 43 to revolve the same in a manner which will be presently described.

55 indicates a switch (shown in Fig. 4) the internal arrangement of which is clearly shown in the diagrammatic view Fig. 8, and 56 indicates a buzzer located as shown in Fig. 4.

To pass now to the wiring, it will be seen from Fig. 4, taken in connection with Fig. 8, that the battery 57 is wired to a binding-post 58 and thence to the motor 25, passing from said motor to the binding-post 59, whence it passes to the binding-post 60 of the electromagnet 54. From said magnet it passes to the binding-post 61 and thence to the binding-post 62 on the shaft of the winged member 43. Supposing that a current was passing through said wiring, it is obvious that the same would pass from the binding-post 62, through the winged member 43, and to the spring-contact 49, then to the binding-post 63 and into the post 64 in the switch 55, through the movable contact 65 to the contact 66 down to the binding-post 67, thence to the battery 57. Supposing, however, that the movable contact 65 of the switch 55 was in contact with the contacts 68 and 69, it is obvious that there would be a break in the circuit, as the current could not bridge over the contact 64 to the contact 66, as above described.

Referring now to Fig. 4, which shows the winged member 43 having its insulated wings located oppositely to Fig. 8, and supposing that the movable contact 65 of the switch 55 to be in contact with the contacts 68 and 69 of the switch 55, the current in this instance would obviously be as follows: Leaving the battery 57, it would pass to the motor 25, thence to the electromagnet 54, and then to the binding-post 62 of the winged member 43.

Referring now to Fig. 4, it will be seen that the current could not pass to the spring-contact 49 on account of the insulation 45, but it would pass to the spring-contact 48 and thence to the contact 68 of the switch 55 and through the movable contact 65 of said switch to the contact 69, then to the contact 66 and back to the battery. It will therefore be seen that the circuit is complete when the winged member 43 is in the position as shown in Fig. 4 and when the movable contact 65 is in the opposite position as that shown in Fig. 8, or, in other words, in contact with the contacts 68 and 69. The controlling of the current and the breaking and closing of the circuit in order to actuate the mechanism will be presently described.

Referring now to the buzzer 56, it will be seen that the same is wired to the battery 57 and also to the binding-post 70 of the spring-contact 50, said spring-contact normally bearing on the face of the locking-disk 38. When the said disk is in the position as shown in Fig. 8 and the spring-contact is in contact with that portion of the face of the said disk which is not insulated, the buzzer will commence to sound for the following reason: The buzzer, as aforesaid, being wired to the battery 57 and to the spring-contact 50, the current passes from said contact 50 to the locking-disk 38, and said locking-disk not being insulated from the metallic side of the casing the current passes from said locking-disk to the casing and from said casing to the shaft of the winged member 43, whence it passes from said winged member to either of the spring-contacts 48 and 49, according to the position of the said winged member 43, and from either of said spring-contacts 48 or 49 it passes into the switch 55 and down to the battery 57, thus completing the circuit and operating the buzzer. When, however, the said locking-disk 38 is in the position as shown in Fig. 4, the spring 50 is insulated from the disk 38 and rests upon the insulation 46. The circuit is therefore broken and the buzzer fails to sound.

Having thus set forth the several parts of my invention in detail, its operation is as follows: When it is desired to operate the name-sheet first in one direction and then in another, this is accomplished by the gearing or the reversing device, as shown in Figs. 6 and 7, which have been previously fully described. To connect, however, the description of these figures, so that the same may be intelligently considered in connection with Figs. 4, 5, and 8, it may again be said that the spur 26 in Figs. 6 and 7 is connected to the motor 25, and according as the spur-wheels 31 and 32 are in the position shown in Fig. 6 or in the position shown in Fig. 7 the spur-wheel 33 will be revolved either in the direction of the arrow in Fig. 6 or in the direction of the arrow in Fig. 7. It will be seen from Figs. 4 and 5 that the movement of the spur-wheel 33 is imparted to the driving-roller 7 by reason of the beveled pinion 35 and the beveled wheel 36, carried on the shaft of said driving-roller. The locking-disk 38 is also carried on said shaft, and as said shaft and roller are revolved by the pinion 33 said locking-disk 38 is also revolved, and as said locking-disk 38 revolves the pin 42 on said disk engages the pin 41, Figs. 10 and 11, on the lever-arm 39, which causes said lever-arm to revolve with said disk. The pin 40 on said lever-arm 39 then enters the radial slots or notches the winged member 43, and as said disk 38 continues to revolve the pin 40 on said lever-arm 39 carries the winged member one-quarter of a revolution, and then the said lever-arm 39 passes out of said radial slot or notch and by gravity drops down into a vertical position. This one-quarter revolution of the winged member 43 carries the insulated wing of said winged member out of contact with one of the spring-contacts 48 or 49 and brings one of the wings which is not insulated into contact with one of the spring-contacts 48 and 49. There being but four wings to this member and two of them being insulated, as shown, it is obvious that one insulated wing and one wing not insulated are always in contact with the spring-contacts 48 and 49. As the contact between the parts 43 and 49 is broken before the disk 43 has made a quarter-revolution or the disk 38 a complete revolution, the momentum of the motor carries the member 43 and disk 38 the remaining distance, or until the locking-bolt engages the locking-disk 38. Following the electrical current in connection with this construction, it will be seen that when the switch is in the position as shown in Fig. 8 the current passing from the battery 57 enters the motor and then passes to the electromagnet 54. The current passing through said magnet draws the bar of said magnet down on said electromagnet, thus carrying the bolt or pin 51 down out of the notch 47 in the periphery of the locking-disk 38, thus unlocking said disk and allowing the same to be free to be revolved. The current, passing from the electromagnet 54, passes through the winged member 43, into the spring-contact 49, through the switch 55, thence back to the battery. The current therefore being complete, the motor starts to operate, which imparts its motion to the driving-roller 7 through the system of gearing before described, and said driving-roller 7 and locking-disk 38 start to revolve. During the revolution of the said locking-disk the current passes through the winged member 43 and into the spring-contact 49 back to the battery; but as the pin 40 on the lever-arm 39 behind the said locking-disk engages the winged member 43 and revolves said winged member one quarter of a revolution one of the insulated wings of said member is brought in contact with the spring member 49, which breaks the circuit and causes the motor 25 to stop. Instantly said circuit is broken the electromagnet 54 releases the pin or bolt 51 and said pin or bolt raises and engages the notch 47 in the locking-disk 38, thus effectually locking said disk 38 and instantly stopping the name-sheet, it being of course understood that the names on the name-sheet are so arranged that one revolution of the driving-roller will bring one name into view and carry the name formerly displayed out of view and onto one of the winding-rollers 8 or 9. One of the insulated wings of the winged member 14 being now in contact with the spring-contact 49, the spring-contact 48 is in contact with one of the wings which are not insulated. Consequently in order to again complete the circuit to start the motor and to actuate the name-sheet it is necessary that the circuit be made through the spring-contact 49. The movable contact 65 of the switch 55 is revolved so that said contact is in contact with the two contacts 68 and 69. Just as soon as this contact is made the circuit is again completed and the motor starts to operate, revolving the driving-roller through the intermediate gearing and revolving the locking-disk 38, which in turn revolves the winged member 43 a quarter of a revolution in the same manner as before described. This quarter-revolution of the winged member carries the wing which was in contact with the contact 48 out of contact with said spring-contact and carries one of the insulated wings in contact with said spring-contact 48. This again breaks the circuit, and the locking pin or bolt 51 is again released from the electromagnet and enters the notch 47 in the locking-disk 38, instantly stopping the name-sheet. In order to again actuate the indicator, the contact 65 of the switch 55 is again turned, and it is understood that at each crossing or street this switch is operated either manually or by any suitable automatic means. It is my intention to operate this indicator on elevated roads as well as surface railways, and a suitable connection between the gates on the fore and aft platforms of the cars can be made with the switch so that the opening of said gates will operate the switch to actuate the indicator. I merely mention this automatic means of operating the indicator to show that the operation of the switch automatically can be effected in a very simple way; but at the same time it is also my intention to have the switch operated by means of a simple switch similar to that shown and described and operated manually.

It is of course apparent that there is no connection between my specific construction of operating mechanism just described and the particular construction of the name-sheet rollers, and it is obvious that this operating mechanism can be used with any approved system of rollers for the name-sheet. However, in order to fully set forth my invention as shown in the accompanying drawings I will now refer particularly to the winding-rollers 8 and 9. It will be seen from Figs. 1 and 2 that the said rollers 8 and 9 have a sprocket-chain 24 passing over small sprockets 23. The shafts of said sprockets 23, which enter the rollers 8 and 9, are provided with an enlarged inner portion 21, which directly extends within the bore of the rollers, as clearly shown in Fig. 2, the coil-spring 22 within the flange 17 of said rollers being connected at one end of said spring to the said shaft and at the outer or free end to the flange 17. It will therefore be seen that the shafts and the sprocket-wheels of either or both of said rollers can be revolved without revolving the rollers proper, as the springs 22 will freely wind or unwind, as is obvious. The reason of this construction can be followed clearly by referring to Fig. 3, which shows the rollers with the name-sheet thereon, and it will be seen that as the driving-roller 7 unwinds the sheet from the winding-roller 8, said roller 8 revolving the roller 9 by reason of the chain connection between the two rollers, roller 9 is revolved so as to wind up the name-sheet which has been unwound from the roller 8. As the sheet is unwound from roller 8 and wound on roller 9 one revolution of the roller 9 will take up more of the name-sheet than is unwound from roller 8, owing to the greater amount of cloth or fabric on roller 9 than on roller 8. Consequently it is necessary that the rollers give to this variation: otherwise the name-sheet could not be actuated. It will therefore be seen that by the construction before described one revolution of the roller 8 will cause one revolution of the sprocket-wheel 23 on the roller 9; but by reason of the coil-spring 22 roller 9 is only revolved sufficient to take up the sheet which has been unwound from roller 8. The tendency of the spring, however, to revolve the roller 9 in order to complete the revolution acts as a tension on the name-sheet and draws the same perfectly tight, but not sufficiently tight to strain.

Having thus fully set forth my invention, I do not wish to be understood as limiting myself to the specific construction herein set forth, as various slight changes might be made therein which would fall within the limit and scope of my invention, and I consider myself clearly entitled to all such changes and modifications.

What I claim as my invention, and desire to secure by Letters Patent of the United States, is—

1. In a station-indicator, the combination with suitable rollers and a name-sheet of a locking-disk secured on the shaft of one of said rollers, a winged member associated with said locking-disk, means actuated by said locking-disk to engage and revolve said winged member, spring-contacts in engagement with said winged member, and an electrical switch arranged substantially as described and for the purposes set forth.

2. In a station-indicator, the combination with suitable rollers and a name-sheet of a locking-disk, and a revoluble member associated with said locking-disk having a portion of said revoluble member insulated, spring-contacts adapted to engage said revoluble member and means for revolving said revoluble member to bring the insulated portions of said revoluble member in contact with the said spring-contacts to break the circuit, and a switch for closing the circuit, substantially as described.

3. In a station-indicator, the combination with suitable rollers and a name-sheet of a locking-disk having a portion of the same insulated, a revoluble member associated with said locking-disk, having portions of said revoluble member insulated, electrical contacts in contact with said revoluble member, means for revolving said revoluble member to bring the insulated portions thereof in contact with the said electrical contacts, a switch for closing the circuit, and an electrical contact in engagement with said locking-disk to actuate a buzzer, substantially as described.

4. In a station-indicator, the combination with suitable rollers and a name-sheet of an electric motor, and means for transmitting power from said motor to said rollers, a locking-disk associated with said rollers and a revoluble member associated with said locking-disk, means operated by said locking-disk for revolving said revoluble member to break the circuit, an electromagnet and means actuated thereby for locking said disk when said circuit is broken, substantially as described.

5. In a station-indicator, the combination of an electric motor, a revoluble member having a portion thereof insulated, electrical contacts in contact with said revoluble member and means for transmitting the motion of said motor to said revoluble member to revolve said member and to bring the insulated portions thereof in contact with the said electrical contacts to break the circuit, and a switch for closing the circuit, substantially as described.

6. In a station-indicator, the combination with an electrical motor of a revoluble member, having portions thereof insulated, electrical contacts associated with said revoluble member, so that one of said contacts is in contact with the insulated portion of said revoluble member, while another of said contacts is in contact with a portion of said revoluble member not insulated, means for revolving said revoluble member to carry the portion of said revoluble member not insulated out of contact with one of said electrical contacts to break the circuit, substantially as described.

7. In a station-indicator, the combination with an electric motor of a revoluble member, having portions thereof insulated, electrical contacts in contact with a portion of said revoluble member not insulated and with one of said insulated portions, intermediate mechanism between said electric motor and said revoluble member for revolving said revoluble member to carry the portion of said revoluble member not insulated out of contact with one of said electrical contacts to break the circuit and to stop said motor, and a switch for closing the circuit, substantially as described.

In testimony whereof I affix my signature in presence of two witnesses.

LEE HOWARD SIMMONS.

Witnesses:
H. B. PESCHAN,
R. W. WALLACE.